United States Patent [19]

Elser

[11] 4,442,759
[45] Apr. 17, 1984

[54] POWER BOOSTER UNIT

[75] Inventor: Dieter Elser, Essingen, Fed. Rep. of Germany

[73] Assignee: Zahnradfabrik Friedrichshafen, AG., Friedrichshafen, Fed. Rep. of Germany

[21] Appl. No.: 275,272

[22] Filed: Jun. 19, 1981

[30] Foreign Application Priority Data

Jul. 18, 1980 [DE] Fed. Rep. of Germany ....... 3027212

[51] Int. Cl.³ ............................................. F16J 1/02
[52] U.S. Cl. ................................ 92/165 PR; 92/178; 92/193
[58] Field of Search ............. 92/165 PR, 165 R, 193, 92/DIG. 1, 178; 308/3 R; 277/136

[56] References Cited

U.S. PATENT DOCUMENTS

| | | | |
|---|---|---|---|
| 2,001,544 | 5/1935 | Phillips | 92/193 |
| 2,064,756 | 12/1936 | Janeko | 92/178 |
| 2,619,914 | 12/1952 | Dobkin | 92/165 PR |
| 3,121,345 | 2/1964 | Zeigler et al. | 92/165 R |
| 3,313,215 | 4/1967 | Bieri | 92/165 R |
| 3,366,017 | 1/1968 | Firth et al. | 92/178 |
| 3,824,905 | 7/1974 | Jablonsky | 92/165 R |

FOREIGN PATENT DOCUMENTS 726482 10/1942 Fed. Rep. of Germany ........ 92/178

*Primary Examiner*—Paul E. Maslousky
*Attorney, Agent, or Firm*—Zalkind & Shuster

[57] ABSTRACT

The piston and cylinder of a hydraulic power booster are provided with opposed longitudinal grooves effecting a pocket for a series of rollers axially aligned and on an axis parallel to that of the piston-cylinder axis. A leaf spring in the piston groove maintains a radial bias on the rollers towards the cylinder groove. The rollers effect a sliding guide or key between the piston and cylinder to prevent rotation or twisting of the piston in the cylinder.

4 Claims, 4 Drawing Figures

POWER BOOSTER UNIT

BACKGROUND OF THE INVENTION

German Pat. No. 23 53 884 shows a power boost device wherein a worm shaft coacts with a piston through a ball thread. The piston extends outwardly of a cylinder and means are provided to prevent relative rotation between the piston and the cylinder. In the construction where a piston rod passes through a cylinder end wall cap, the piston rod and the aperture through which it passes have a polygon profile to prevent rotation which would be undesirable in the type of mechanism shown in that patent.

The manufacture of polygon profile matching parts is relatively expensive, and also has the disadvantage that wear between the rubbing surfaces can cause a certain amount of rotational play which is undesirable. Additionally, a special designed seal for the piston rod extension is required.

BRIEF DESCRIPTION OF THE PRESENT INVENTION

The present invention effects a low cost arrangement for preventing rotation between a booster piston and the cylinder which effects a minimum of play throughout the working life of the booster power system.

The arrangement herein is effected by providing a longitudinal groove in the servocylinder facing a groove in the piston body wherein the two grooves form a space or pocket to accommodate a series of rollers biased by a leaf spring against the cylinder groove and thereby forming a type of sliding guide keyway in the opposed longitudinal grooves. Accordingly, the rollers are maintained in biased condition against the groove in the cylinder to compensate for any wear in the relatively moving parts and eliminating rotative play between the piston and the cylinder.

The invention is of particular novelty and utility in booster steering systems of the kind shown in German Pat. No. 22 53 984 wherein manual steering force is transmitted through bevel gearing to steering shaft having a threaded connection to a servopiston and extending into a hollow piston rod which extends outside a servocylinder for connection to a steering linkage.

In such arrangements it is of importance to keep the piston from being rotated by operation of a threaded shaft so that no torque or twisting force will be exerted on the connection to the steering linkage.

A detailed description of the invention now follows in conjunction with the appended drawing, in which FIG. 1 is a longitudinal section through a booster power unit of a power steering system;

Figure 1:
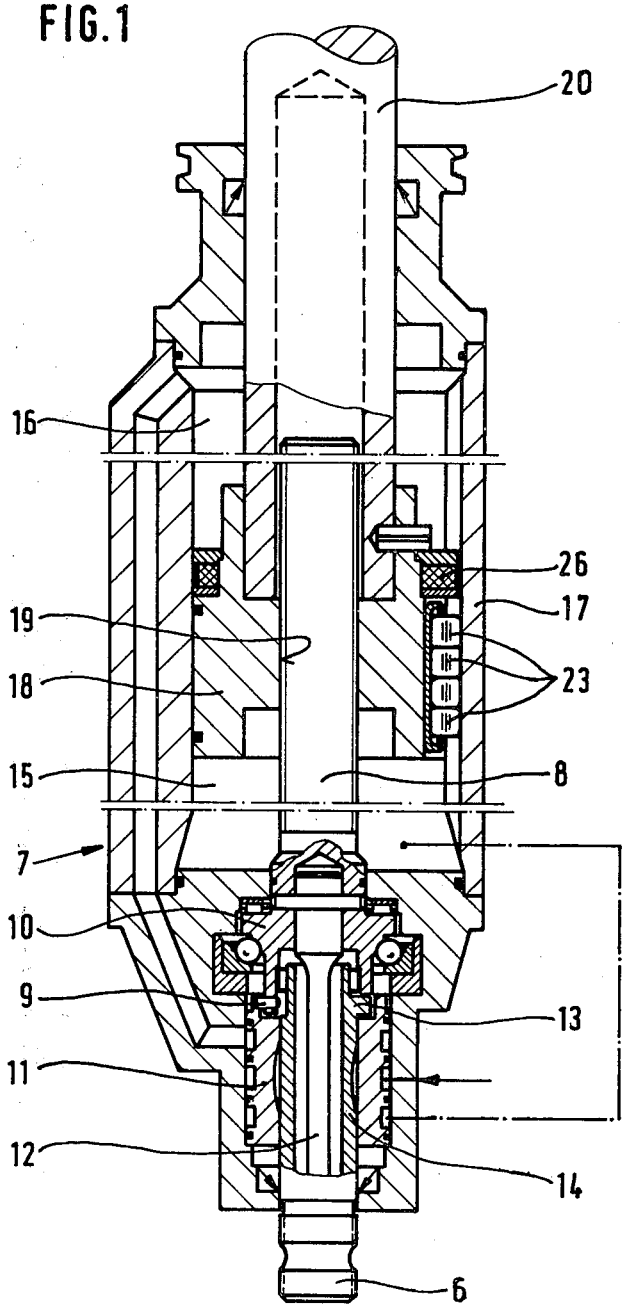
Figure 2:
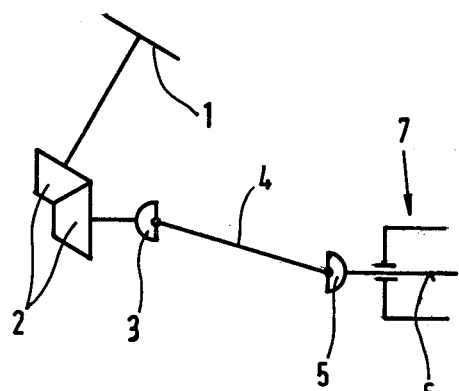
FIG. 2 is a schematic diagram of a power steering system in which the servocylinder improved by the present invention is employed.
Figure 4:
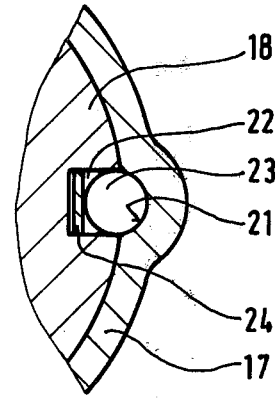
FIG. 4 is a partial radial cross section on the line IV—IV of FIG. 4.

Referring to FIGS. 1 and 2 of the drawing, the invention comprises a manual steering wheel 1 which connects to a steering spindle 6 through bevel gearing 2 via a first universal joint 3, a steering drive shaft 4 and a second universal joint 5. The steering spindle 6 is a component of a booster steering unit 7 and extends into a collar 10 of a threaded shaft 8. At the collar 10 shaft 8 is locked to a valve sleeve 11 by means of a pin 9. Spindle 6 and shaft 8 are coupled to each other through a torque rod 12. Rotational traverse of spindle 6 for a predetermined degree is determined by a key 13 in the spindle movable in a slot of the valve sleeve against torque stress of rod 12, whereupon after limited spindle rotation, the shaft 8 is directly driven by spindle 6, all in a well known manner.

Valve sleeve 11 encompasses a rotary valve plug 14 integral with spindle 6 and the valve sleeve and valve plug have the usual coacting flow control grooves to control flow to and from the pressure chambers 15, 16 of a double acting servocylinder 17 separated by piston 18. Relative rotation between the valve members thus causes control of flow to and from the pressure chambers depending upon direction of rotation for supply of pressure oil to a chamber while exhausting the other for reciprocating the piston 18. A sealing ring 26 is disposed between ring washer at one end of the piston 18. A steering nut 19 within the piston engages threaded shaft 8.

Thus, initially upon rotation of spindle 6 due to resistance of the vehicle wheels the piston does not move and hence the end of torque rod 12 connected to shaft 8 is held stationary whereby torque rod 12 is torsionally stressed permitting relative rotation between the valve members 11 and 14 to initiate boost power, all as is well understood by persons in the art.

Piston 18 has integrally secured thereto a piston rod 20 which is tubular to the extent of accommodating shaft 8 as the piston reciprocates. Although not shown it will be understood that piston rod 20 connects to a steering linkage via a cardan joint.

The preceding description is of a generally conventional nature and therefore need not be described in greater detail.

Figure 3:
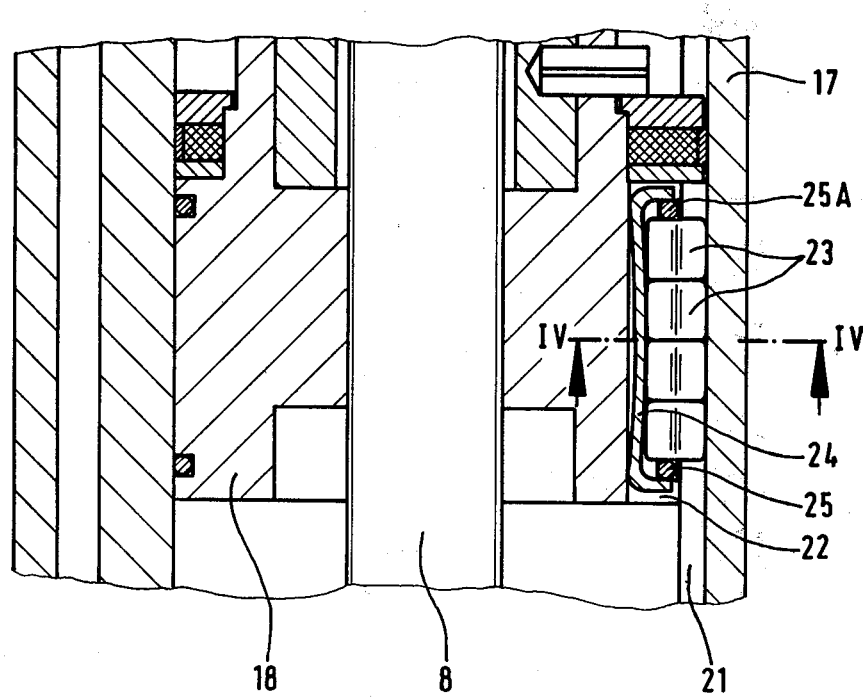
FIG. 3 is an enlargement in longitudinal section of the particularly novel components of the invention as seen in FIG. 1.

The particular invention comprises a longitudinal groove 21 (FIG. 3) in the side wall of servocylinder 17 and an opposite groove 22 longitudinally extending along the side of piston 18. These opposed longitudinal grooves form a longitudinal pocket having an axis generally parallel to the servocylinder axis and which pocket holds a plurality of cylindrical rollers 23 in stacked array and generally coaxial on an axis generally parallel to the servocylinder axis.

Carried in the groove 22 and supported against the bottom of the groove is a leaf spring 24 suitably bowed to bear against the rollers as a bias means for biasing the rollers into the groove 21 which is circular in shape to conform to the circular shape of the rollers. The assembly of rollers is maintained by the bent ends of the leaf spring, as shown, which embrace respective metal rings 25 and 25A disposed between the bent ends of the spring and the respective ends of the roller stack. The rings 25 and 25A circumferentially encompass the piston and are carried in suitable grooves whereby the roller stack is fixed in position in the piston groove 22.

By the above construction a maintenance free and self adjusting means for overcoming torsional rotation forces on piston 18 and piston rod 20 is effected. Rotational looseness resulting from wear due to friction is eliminated. Further, the rollers can be selected of varying dimension to seat without play in groove 22 of piston 18.

The invention hereinabove described is particularly suitable for front steering vehicles whereby the booster unit 7 can be mounted as closely as possible to the steering axis. The steering force transmitting components from the booster unit to the wheels can thus be kept very short which results in high steering precision. The invention is also useable in other ways, for example, for operating the hatches of ships. In such case a hand wheel can be mounted directly to the spindle 6, thus eliminating the bevel gearing 2, shaft 4 and universal joints 3, 5.

I claim:

1. In a power steering unit having a cylinder and a piston therein, and means for overcoming torque force on said piston; the improvement of said means comprising respective longitudinal opposed grooves in said cylinder and said piston wherein the groove in said cylinder extends at least the length of traverse of said piston therein;

said grooves effecting a pocket; guide means in said pocket carried slidably by said piston within said grooves so as to prevent relative rotation between said cylinder and piston by sliding in the groove of said cylinder during reciprocation of said piston; wherein said guide means comprises at least one roller having axes parallel to the cylinder axis and bias means for biasing said roller against the groove of said cylinder.

2. In a power steering unit having a cylinder and a piston therein, and means for overcoming torque force on said piston; the improvement of said means comprising respective longitudinal opposed grooves in said cylinder and said piston wherein the groove in said cylinder extends at least the length of traverse of said piston therein;

said grooves effecting a pocket; guide means in said pocket carried slidably by said piston within said grooves so as to prevent relative rotation between said cylinder and piston by sliding in the groove of said cylinder during reciprocation of said piston; wherein said guide means comprises a plurality of rollers having axes parallel to the cylinder axis and bias means for biasing aaid rollers against the groove of said cylinder.

3. In a power booster unit as set forth in claim 1, wherein said bias means comprises a leaf spring in the groove of said piston.

4. In a power booster unit as set forth in claim 2, wherein the groove of said cylinder is circular to conform to the periphery of said rollers.

* * * * *